US000001926H

United States Statutory Invention Registration [19]

[11] Reg. Number: H1,926

[45] Published: Dec. 5, 2000

Carruthers et al.

[54] ACTIVELY MODE-LOCKED, SINGLE-POLARIZATION, PICOSECOND OPTICAL FIBER LASER

[76] Inventors: Thomas F. Carruthers, 12112 Amblewood Dr., Laurel, Md. 20708; Irl N. Duling, III, P.O. Box 533, Round Hill, Va. 20142

[21] Appl. No.: 08/825,942

[22] Filed: Apr. 1, 1997

[51] Int. Cl.[7] ..... H01S 3/00

[52] U.S. Cl. ..... 375/6

*Primary Examiner*—Daniel T. Pihulic

[57] ABSTRACT

An optical fiber laser source comprising a polarization-maintaining loop and a birefringence-compensating branch preferably operatively connected to a length-stabilizing element is disclosed. The optical fiber laser source provides soliton pulse compression to reduce the duration of the pulses of the output pulse train to 1.3 ps or less.

18 Claims, 9 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

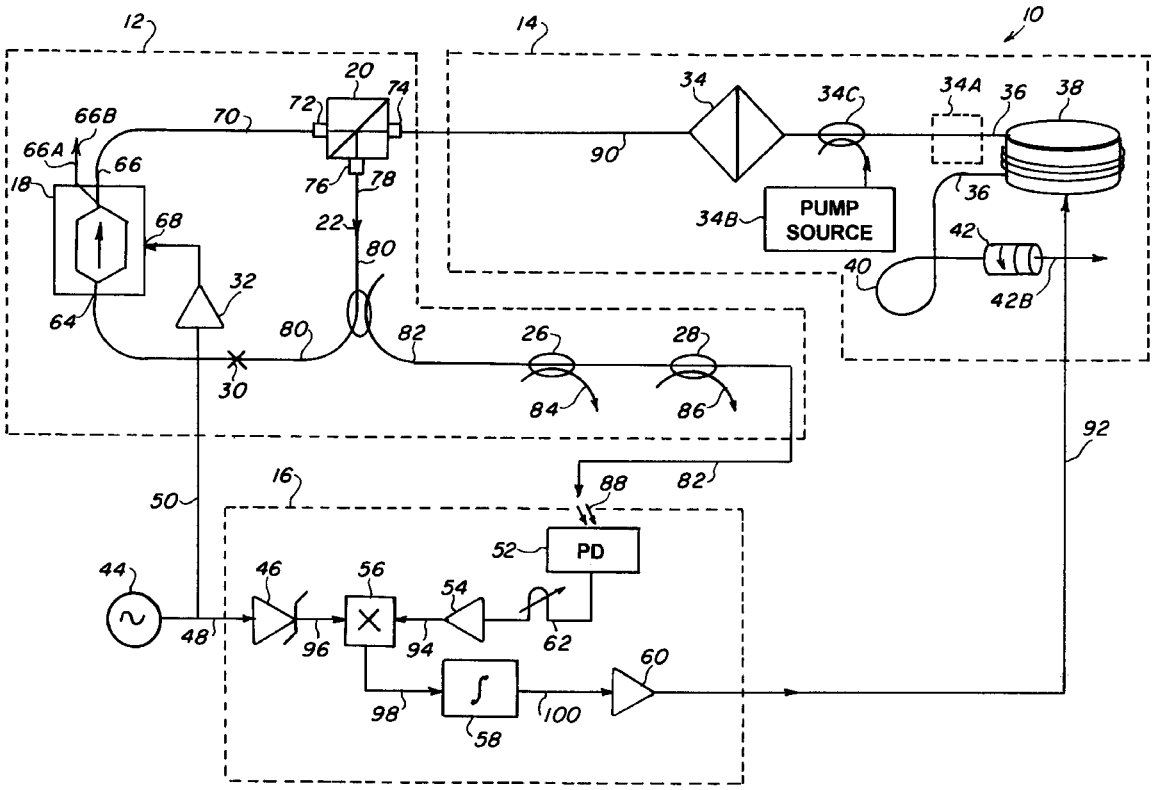

ACTIVELY MODE-LOCKED, SINGLE-POLARIZATION, PICOSECOND OPTICAL FIBER LASER

BACKGROUND OF THE INVENTION

1. Field of the Invention

The present invention relates to laser sources used in optical communication systems and, more particularly, to an optical fiber laser source whose repetition rate is precisely controlled by an accurate frequency signal standard.

2. Description of the Related Art

Laser sources, such as optical fiber lasers, have a need for producing high-repetition pulses in the range of 10 Giga (G) bits/second, a pulse duration of less than 2 picoseconds, essentially no pulse drop-out, and low phase and amplitude noise. The optical fiber lasers commonly employ passive or active mode locking to attain these ends.

Passive mode locking relies on incorporating elements in a fiber laser that transmit high-intensity light more easily than low-intensity light. Since a train of pulses has a higher peak power than a continuous beam, such a laser will produce very brief pulses. A traditional means of passive mode locking is the use of a fast saturable absorber. In a typical saturable absorber a light beam encounters a finite number of absorber molecules. When all of the molecules are excited, the dye is bleached and the dye becomes transparent to the light. Saturable absorbers with a fast recovery time absorb long, low-intensity pulses but bleach out with brief, high-intensity pulses. Passive mode locking depends on the laser having an overall lower loss for higher-energy pulses than for lower-energy pulses, but one way to produce high-energy pulses is for one pulse to steal energy from another. For this reason, passive mode-locked lasers have an inherent tendency to produce incomplete pulse streams.

For certain applications of the optical communication systems, it is desired that the operations being performed by is different users be synchronized to a standard frequency source. In such synchronized optical communication systems, a lasing material serving as a laser source that provides coherent light is termed as being "actively mode-locked," meaning that its repetition rate can be controlled by an accurate external electronic standard, and such systems are described in a first technical article by T. F. Carruthers, I. N. Duling, III, and M. L. Dennis, "Active-Passive Mode Locking in a Single-Polarization Erbium Fiber Laser," published in *Electron Lett.* 13, (1994), and in a second technical article of T. F. Carruthers and I. N. Duling, III, "A 10-GHz, Single-Polarization, Actively-Mode-Locked Picosecond Erbium Fiber Laser," Optical Fiber Conference, vol. 2, 1996 OSA Technical Digest Series (Optical Society of America, Washington, D.C., 1996) pp. 7–8, both of which technical articles are herein incorporated by reference for all purposes. Moreover, mode-locked laser light sources are described in U.S. Pat. Nos. 4,665,524 ('524); 5,546,414 ('414); and 5,574,739 ('739) all of which are herein incorporated by reference.

Active mode locking alone produces an uninterrupted string of pulses, but the pulse durations are governed by the Kuizenga-Siegman relationship more fully disclosed in the technical article entitled, "FM and AM Mode Locking of the Homogeneous Laser—Part I: Theory" of D. J. Kuizenga and A. E. Siegman, IEEE J. Quantum Electron. 6,694 (1970), which is herein incorporated by reference. During such active mode locking, the pulse duration tends to be lengthened by the gain bandwidth $\Lambda_g=1/\tau_g$ of the laser, but the time window $T_a$ of the active mode locking has a pulse-shortening influence. The actual pulse duration $\tau$ turns out to be proportional to the geometric mean of the two influences: $\tau \cong (\tau_g \cdot T_a)^{1/2}$. The pulse duration that is typically produced by active mode locking at a 10 Giga Hertz (GHz) repetition rate is a minimum of about 5 picoseconds, too long for many intended applications, and it is desired to further shorten the pulse.

Short pulse durations may be attained in an optical fiber laser through a process called soliton pulse shortening. A pulse propagating in an optical fiber will, under certain very general conditions, tend to shape itself into a specific type of pulse called a soliton—a "solitary wave"—that propagates without changing its shape. Such a pulse has a specific intensity profile, and, other things being equal, a higher-energy pulse will reshape itself into a briefer soliton than will a lower-energy pulse. Soliton pulse compression provides an additional pulse-shortening mechanism in a manner more fully disclosed in the technical article entitled, "Solitary-Pulse Stabilization and Shortening in Actively Mode-Locked Lasers" of F. X. Kärtner, D. Kopf, and U. Keller, J. Opt. Soc. Am. B 12,486 (1995), which is herein incorporated by reference.

Further details for producing short duration pulses are disclosed in the technical article of D. J. Jones, H. A. Haus, and E. P. Ippen, "Subpicosecond Solitons In An Actively Mode-Locked Fiber Laser," Opt. Lett. 21, 1818 (1996), which is herein incorporated by reference. It is desired that the pulses produced by an optical fiber laser be further improved, especially their duration being further shortened or reduced.

The actively mode-locked laser sources may be further improved if their insensitivity from environmental error contributors, such as environmentally-induced birefringence variations, is increased. Fiber birefringence can be a major problem, since the polarization state of a pulse can become scrambled in as little as a few cm of propagation. Birefringence can be due to residual stresses in the fiber from its drawing, or to stress induced from winding the fiber. Birefringence can also change with temperature and other environmental factors, causing time-varying polarization states. A special fiber, called polarization-maintaining fiber, has an intrinsic birefringence larger than any environmental birefringence it will encounter, so that light launched with its polarization along a primary axis will remain on that axis. The environmental error contributors degrade the stability of the laser source in a manner more fully described in the already incorporated by reference '524 patent. Increased insensitivity is accomplished by polarization maintaining (PM) or by birefringence-compensation techniques, both known in the art and more fully described in the previously incorporated by reference technical articles. Further, polarization-maintaining means, such as polarization-maintaining fiber, is more fully described in the already incorporated by reference '739 patent.

In addition to the above desired features, the optical fiber laser source satisfies a wide range of operating requirements if it provides pulses having low timing error and low amplitude jitter, as well as having a low pulse drop-out rate, that is, missing pulses in the associated pulse train produced by the laser source that are low in number, more particularly, less than one in $10^{12}$.

It is desired that an optical fiber laser source be provided that is actively mode-locked, insensitive to environmentally induced birefringence variations, and generates a pulse train in the GHz range that has a pulse drop-out rate less than $10^{-12}$, wherein each pulse has a low timing error and a low amplitude jitter.

OBJECTS OF THE INVENTION

Accordingly, it is a primary object of the present invention to provide an optical fiber laser source that is actively mode-locked, wherein its pulse repetition rate is accurately controlled by an external frequency source.

It is a further object of the present invention to provide an optical fiber laser source substantially free of environmentally induced birefringence variations achievable by utilizing a polarization-maintaining (PM) and/or a birefringence-compensation technique.

Further, it is an object of the present invention to provide an optical fiber laser source that creates a pulse train in the GHz range that has a drop-out rate of less than $10^{-12}$, wherein each pulse is substantially free of timing errors and amplitude jitter.

SUMMARY OF THE INVENTION

The present invention is directed to a polarization-maintaining and birefringence-compensated loop that operatively cooperate with a phase sensitive detector for providing actively mode-locked operation of the optical fiber laser source.

The optical fiber laser source comprises a lasing material having input and output sections, a source for activating the lasing material, an anomalous-dispersion fiber, dispersion compensation means, an isolator, and a first coupler. The lasing material has a length in the range of about 0.5 to about 100 m and an input and an output section. The source for activating the lasing material produces light that is injected into the lasing material. The optical fiber laser further comprises a modulator having input and output stages and a control terminal for receiving a modulating signal provided by a frequency signal generator. The modulator is responsive to the modulating signal for developing a carrier signal at its output stage that is varied and in sympathy with the modulating signal. The carrier signal is applied to the input section of the lasing material. The anomalous-dispersion fiber has a length in the range of about 10 m to about 10 km and an input and an output with the input connected to the output stage of the lasing material. The dispersion-compensation means when taking the form of a fiber has a length in the range of about 1 m to about 100 m and an input and an output with the input connected to the output of the anomalous-dispersion fiber. The isolator has an input and an output with the input connected to the output of the dispersion-compensation means. The first coupler has first fiber means for connecting to the output of the isolator and coupling a predetermined ratio of a signal thereat. The coupler also has second fiber means for connecting the signal at the output of the isolator to the input section.

BRIEF DESCRIPTION OF THE DRAWINGS

These and other objects, features and advantages of the invention, as well as the invention itself, will become better understood by reference to the following detailed description when considered in connection with the accompanying drawings wherein like reference numbers designate identical or corresponding parts throughout and wherein.

DETAILED DESCRIPTION OF THE PREFERRED EMBODIMENTS

Figure 1:
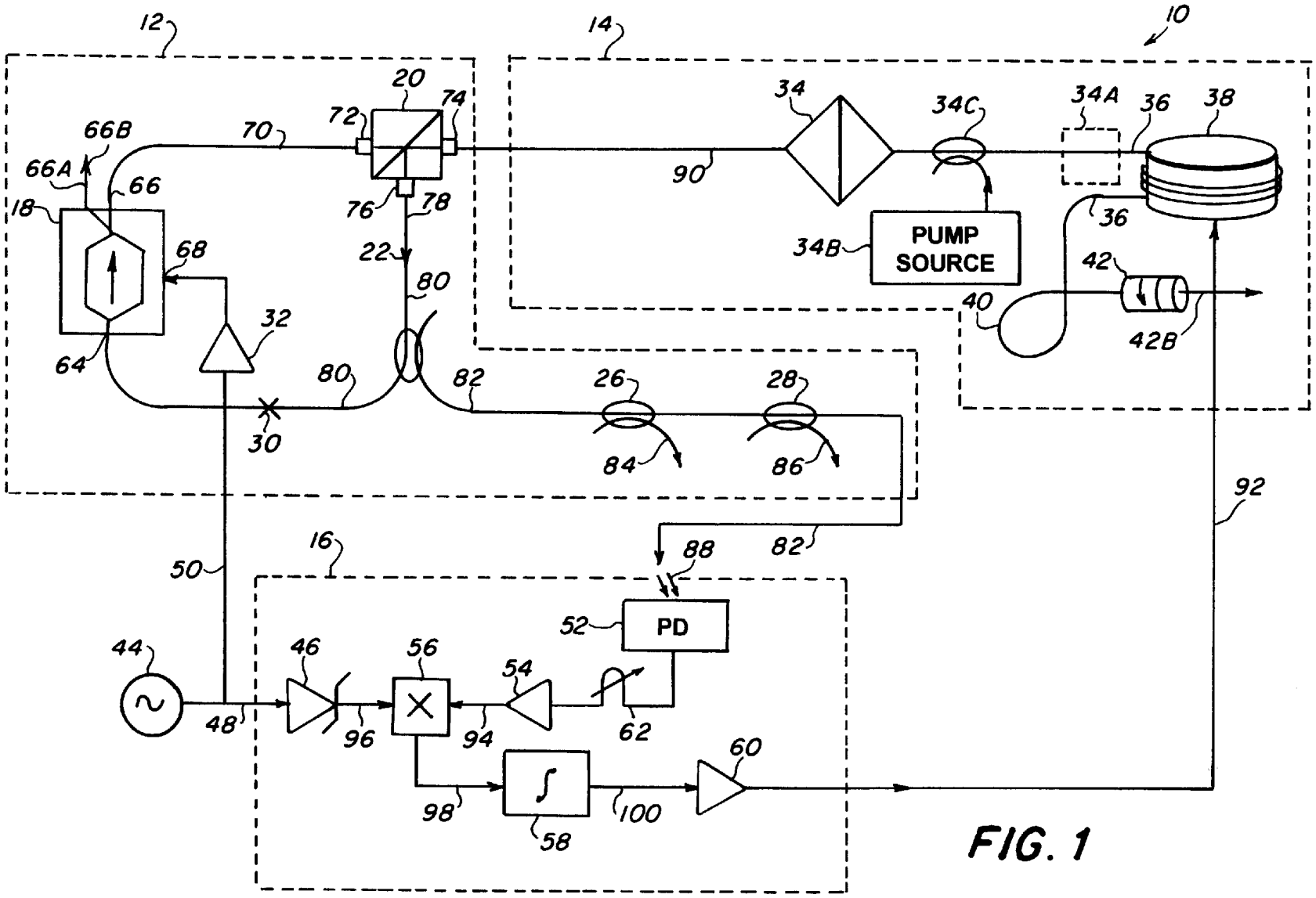
FIG. 1 is a block diagram of one embodiment of the present invention.

Referring now to FIG. 1, there is shown a block diagram of an optical fiber laser source 10 comprising a polarization-maintaining loop 12, a birefringence-compensating branch 14, and, preferably, a phase sensitive detector 16. As will be described, the laser source 10 is an actively mode-locked laser that utilizes intracavity non-linear pulse compression techniques to produce a completely filled pulse train with pulses having a typical pulse duration of 1.24 picoseconds (ps) and occurring at repetition rates in excess of 10 GHz. The optical fiber laser source 10 produces a pulsed laser having a sigma configuration which is described in the previously mentioned '739 patent. The sigma configuration allows the use of non-polarization-maintaining (PM) fiber in branch 14 extending off the polarizing beamsplitter to be described. This is due to the action of the Faraday rotator/mirror, described in the technical article of I. N. Duling III and R. D. Esman, "Single-Polarization Fiber Amplifier," Electron. Lett., 1992, 28, pp. 1126–1127; and I. N. Duling III and Ronald D. Esman, "Method and Apparatus for Polarization-Maintaining Fiber Optical Amplification with Orthogonal Polarization Output" and U.S. Pat. No. 5,303,314, both of which are herein incorporated by reference.

The optical fiber laser source 10 operates in a single-polarization mode which produces linearly polarized light that is substantially insensitive to environmental noise, such as mechanical vibrations and other contributors more fully described in the previously mentioned '524 patent. The single-polarization mode commonly utilizes an amplifier as well as a Faraday rotator/mirror that was originally conceived as a means of getting non-polarization-maintaining fiber to avoid the noise introduced in signals by birefringence variation. The Faraday rotator/mirror combination reflects light in a polarization state orthogonal to its incident state. In such operation, for every point in the birefringent fiber, the orthogonal relation between the incident and returning light is preserved; any birefringence encountered by the light on the way into the fiber is compensated for on the way out. More particularly, if the incident light is linearly polarized, the returning light is also linearly polarized and rotated by 90°.

The polarization-maintaining (PM) loop 12 comprises a modulator 18, a beamsplitter 20, an isolator 22, optical couplers 24, 26 and preferably 28, a phase shifter 30 for providing a 90° phase shift, and preferably an amplifier 32. The polarization-maintaining (PM) loop 12 is constructed of polarization-maintaining components and polarization-maintaining means for transmission, all known in the art and more fully described in the '739 patent.

The birefringence-compensating branch 14 comprises a lasing material 34 cooperating in one embodiment with a laser diode 34A, shown in phantom. The lasing material 34 is excited by a pump source 34B coupled thereto by a coupler 34C. The pump source 34B produces light that is injected into the lasing material. The pump source 34B is an optical source, usually a laser, which, in one embodiment, excites the Erbium (Er) atoms in the core of the lasing material 34. The pump source 34B may be a diode-pumped Nd solid-state laser. The birefringence-compensating branch 14 further comprises, in the embodiment of FIG. 1, anomalous-dispersion fiber 36, a piezoelectric (PZT) cylinder 38, a normal-dispersion fiber 40, that, for the embodiment of FIG. 1, serves as dispersion compensation means 40, and a Faraday rotator/mirror 42. The dispersion-compensation means 40 may also be provided by grating means such as that incorporated into a fiber called a chirped fiber Bragg grating, known in the art, or grating devices commonly known in the art.

The phase sensitive detector 16 is preferably included in the embodiments of the present invention and receives a signal generated by a frequency source 44, which may be a 10 GHz synthesizer, that is routed to a first amplifier 46 of the phase sensitive detector 16 via signal path 48. The frequency source 44 generates a modulating signal, preferably a periodic electrical signal, such as a pulsed signal or, more particularly, a sine wave signal with a frequency of about 10 GHz, for actively mode-locking light internal to the laser source 10. In operation, the frequency of signal supplied by the source 44 is an integral multiple of the round trip time for light, produced by the optical fiber laser source 10, to travel through its associated cavity, and is more fully described in the '739 patent. The frequency source 44 delivers the generated signal to the amplifier 32 of the polarization-maintaining (PM) loop 12, via signal path 50. The phase sensitive detector 16 further comprises a photodetector 52 known in the art, and a second amplifier 54 which preferably is a limiting amplifier, as is the first amplifier 46. The phase sensitive detector 16 further comprises a phase detector 56, an integrator 58, a high voltage amplifier 60, and preferably a tuning stub 62.

The modulator 18 may be of a Mach-Zehnder type, an acousto-optic modulator, bulk electro-optic, or phase modulator, all known in the art and to be further discussed hereinafter. Further details of the operation of the modulator, especially a Mach-Zehnder amplitude modulator, are described in the '739 patent. The Mach-Zehnder may be an integrated $LiNbO_3$ amplitude modulator with a 10-GHz bandwidth. The modulator 18 has input and output stages 64 and 66, respectively, and a control terminal 68 for receiving the 10 GHz signal of frequency synthesizer 44 that serves as the modulating signal. The modulator 18 operatively responds to the modulating signal of the frequency synthesizer 44 and develops a carrier signal at the output stage 66 that is varied and in sympathy with the modulating signal and is routed to the beamsplitter 20, via signal path 70 which may be provided by an appropriate optical fiber of the polarization-maintaining type, known in the art. The Mach-Zehnder modulator 18, driven by a 10 GHz sine wave, harmonically mode locks the lasing material 34 and causing approximately 9960 pulses to be circulated in a 192 meter (m) effective cavity length to be further described. In one embodiment, the Mach-Zehnder modulator 18 may have two output stages 66 and 66A with stage 66A providing a laser output 66B.

The beamsplitter 20 has a trunk stage 74 and a polarized stage with first and second sections 72 and 76 for distributing signals in predetermined portions. The carrier signal from the output stage 66 of the modulator 18 is received by polarized stage 72 The beamsplitter 20 is preferably a polarizing beamsplitter known in the art that passes two orthogonally polarized signals onto and from a common fiber. Another device, known as an optical circulator, may be substituted for the polarizing beamsplitter. The circulator is commercially available and is preferably a three-port polarization-maintaining circulator. The beamsplitter 20 may be of the type described in the '739 patent. The second section 76 of the beamsplitter 20 is routed, via an appropriate optical fiber 78, to an isolator 22 which preferably is a single-polarization isolator, also known in the art and provides an output signal on signal path 80 which preferably comprises an appropriate optical fiber. The isolator 22 is polarization-maintaining, polarization independent and may be of the type described in the '739 patent. The fiber 78, as well as the other fibers within the polarization-maintaining loop 12, is a polarization-maintaining fiber.

The signal path 80 provided by an appropriate optical fiber is routed to the optical coupler 24 which allows a predetermined portion of the signal traveling in optical fiber 80 to be routed to the phase shifter 30, via signal path 80. In actuality, the signal flowing in signal path 80, as well as in signal path 78, is a train of laser pulses resulting from the amplitude modulator carrier signal of modulator 18 interacting with the lasing material 34 in a manner to be more fully described hereinafter. The phase shifter 30 causes the signal being conducted by signal path 80 to be phase shifted by 90° so as to maintain the proper polarization orientation of the light circulating in the polarizing-maintaining loop 12 to be more fully described hereinafter. The phase shifter 30 may be replaced by a 90° polarization-maintaining/polarization-maintaining splice, or a 90° Faraday rotor in a manner more fully described in the '739 patent.

The optical coupler 24, as well as optical coupler 26 and preferably optical coupler 28, allows the remainder of the signal extracted by optical coupler 24, that is, the signal that is not directed to the phase shifter 30, to be directed for further processing. The optical couplers 24, 26, and 28 may be of the type described in the '739 patent, each has a preselected ratio for outputting and passing light. For the embodiment shown in FIGS. 1–3, the output coupler 24 extracts 20% of the carrier signal developed by the modulator 18 and directs that 20% signal to the optical coupler 26, via signal path 82 which preferably is an optical fiber. The optical coupler 24 allows 80% of the signal intercepted by the optical coupler 24 to be directed to the phase shifter 30.

The optical coupler 26 extracts 50% of the carrier signal flowing in optical path 82 and such an extracted signal serves as a signal output 84. The signal output 84 comprises a train of laser pulses that, in one embodiment, serves as the output of the optical fiber laser source 10. The output coupler 26 may be located almost anywhere within the optical fiber laser source 10 or the other embodiments to be described. Placing the output coupler 26 in the non-PM branch that is, branch 14,; however, would have the disadvantage of the output not being linearly polarized. Also, components, such as the modulator, may be modified to allow other output locations in a manner as to be described with reference to FIG. 2. The optical coupler 26 allows the remaining 50% of the signal traveling in signal path 82 to be directed onto optical coupler 28. The optical coupler 28 allows 80% of the signal intercepted by optical coupler 28 to be extracted and such 80% extracted signal serves as signal 86 which is a diagnostic signal. The diagnostic signal 86 may be routed to external equipment that monitors for the operational readiness of the optical fiber laser source 10.

The optical coupler 28 allows 20% of its intercepted signal to flow therethrough and be launched out of the end of the optical fiber 82 as light rays 88, representative of the pulse train generated by the lasing material 34 operatively cooperating with the amplitude modulated carrier signal of the modulator 18. The light rays 88 intercept the photodetector 52 of the phase sensitive detector 16.

It is preferred that the practice of the present invention include the phase sensitive detector 16 which cooperates with and controls the birefringence-compensating branch 14 which includes the lasing material 34 that receives the carrier signal developed, amplified, and modulated by modulator 18. The lasing material 34 receives the carrier signal by way of signal path 90 which is connected to the trunk stage 74 of the beamsplitter 20 by an appropriate optical fiber which need not be a polarization-maintaining fiber such as those of the polarization-maintaining loop 12. The appropriate optical fiber providing the signal path to the trunk stage 74, as well as the other optical fibers of the birefringence-compensating branch 14, may be low birefringence fiber known in the art and more fully described in U.S. Pat. No. 5,450,427 which is herein incorporated by reference.

The lasing material 34 has input and output sections and receives the carrier signal produced by the polarization-maintaining (PM) loop 12. The lasing material 34 may be a gain fiber having a dopant comprising Erbium (Er) material. The Er atoms are optically pumped with 980-nm or 1480-nm laser diodes serving as pump source 34B. The gain spectrum of the lasing material 34 from receiving such excitation is from ~1530 to ~1570 nm. The gain fiber 34 may be of the type described in the '739 patent or in U.S. Pat. No. 4,425,039 ('039) which is herein incorporated by reference. Dopants other than Erbium may be used resulting in a wide choice of operating wavelengths for the laser source 10 in a manner known in the art. The Erbium dopant gain fiber 34 may be a Nd:YLF pumped Yb-Er fiber amplifier so as to provide for optical gain, but other devices, such as a laser diode 34A, may be used to provide for optical gain. The ytterbium Yb fiber has a broader absorption spectrum and can be pumped at 850 and 1060 nm (for example) by pump source 34B. The Yb quickly transfers its energy to the Er during its operational phase. The gain fiber 34 may be a non-polarization-maintaining fiber which is of particular importance to the present invention.

Figure 2C:
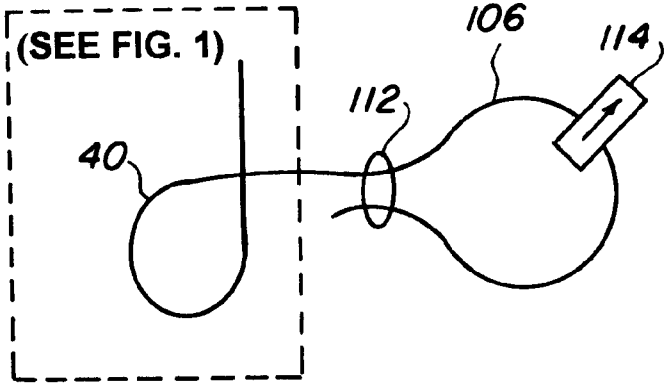
FIG. 2 is composed of FIGS. 2(A), 2(B) and 2(C) each of which illustrates a loop mirror-Faraday rotator arrangement to replace the Faraday rotator shown in FIG. 1.
Figure 2A:
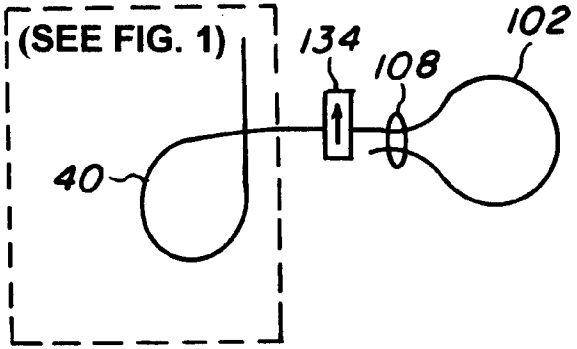
Figure 2B:
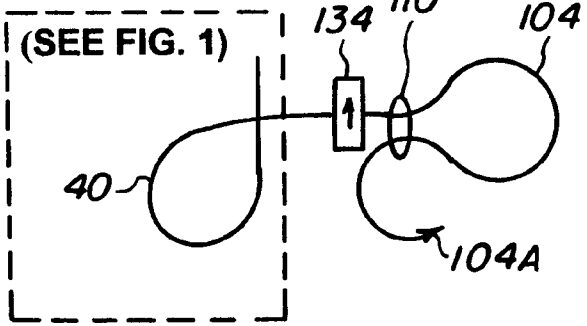
Figure 3:
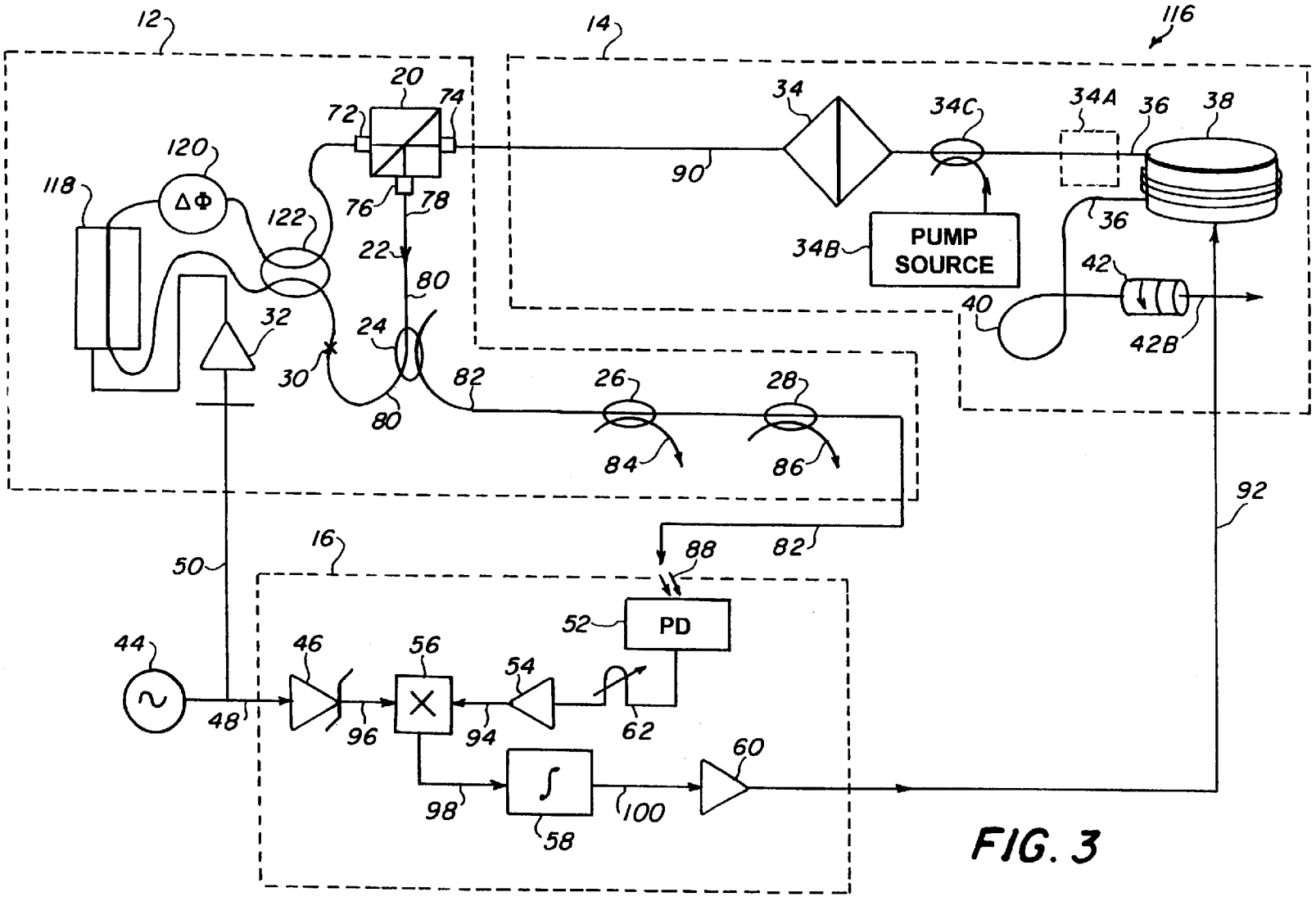
FIGS. 3, 4, 5 and 6 each illustrate a block diagram of an alternate embodiment of the present invention.

In the embodiment shown in FIGS. 1, 2 and 3, the activation, sometimes referred to as pumping, of the fiber 34 is primarily accomplished by pump source 34B preferably comprising laser diodes, but other devices for pumping the lasing material 34, such as a diode-laser or ion-laser pumping, both known in the art, may be provided in the practice of the present invention.

The Nd:YLF-pumped Yb-Er fiber amplifier 34 may have a maximum small-signal gain of 30 dB and a saturated output power of 22 dBm at an operating wavelength of 1565 nm. The light output of the laser material 34, having amplifying characteristics and no need for laser diode 34A, is applied to the anomalous-dispersion fiber 36 which is wound on the piezoelectric (PZT) cylinder 38 and has a predetermined length, such as 60 meters (m). The anomalous-dispersion fiber 36 may be dispersion-shifted fiber type although other types may also be used. The anomalous-dispersion fiber 36 provides a non-linear, pulse-shorteneding mechanism that operates on the pulses of the pulse train. The anomalous-dispersion fiber need not be a separate component fiber in the laser. Other fiber, such as the gain fiber, in the laser may have an anomalous dispersion and, if present in sufficient length, may serve to shorten the optical pulses by soliton by soliton compression processes.

The present invention implements shortening of the pulse duration to be to about 1.3 ps or less, which is of particular importance, by the process called soliton pulse shortening or compression discussed in the "Background" section. Soliton pulse compression, in the practice of the present invention, consists of arranging certain properties of the laser that are given as follows: (1) the amount of optical energy in a single pulse, (2) the average fiber dispersion, and (3) the length of fiber in the laser so that propagating pulses will tend to shape themselves into solitons with the desired short pulse duration. We have developed an actively mode-locked Er optical fiber laser source that utilizes intracavity soliton formation to produce a completely filled pulse train with a pulse duration of 1.3 ps at repetition rates in excess of 10 GHz; well below the Kuizenga-Siegman, previously discussed, limit of ~5 ps for this laser. Allowing the pulses to evolve within the laser cavity, to be described, has several benefits over extra-cavity soliton pulse evolution. More particularly, the pulse energies circulating within the laser are significantly higher than those coupled out, so soliton evolution is easily attained in a relatively short cavity. Further, the average cavity dispersion can be controlled, so that the pulse duration and the energy of a propagating soliton can be tailored to the desired repetition rate and available optical amplifier power. Moreover, the cavity length can be actively controlled so as to eliminate environment contributions to the phase noise. In addition, the optical fiber laser source 10 is driven by an external oscillator, allowing it to be synchronized to a master clock in an optical fiber communications system. The components of the optical fiber source 10 are either polarization maintaining (PM) or birefringence compensated, making the laser insensitive to environmentally induced birefringence variations.

The embodiment of FIG. 1 produced a completely filled pulse train with a pulse duration of 1.3 ps at repetition rates in excess of 10 GHz. The embodiment comprised a non-PM branch 14 that included a ~10 m of Yb:Er-doped gain fiber, pumped by diode-pumped Nd solid-state lasers, which has a saturated output power of 200 mW at 1565 nm. Also in the birefringence compensating branch 14 was a 14.9 m of dispersion-compensating means 40, which reduces the average anomalous dispersion (D) of the laser cavity, comprising elements 36 and 40, to 2.0 ps/(nm km). The birefringence compensating branch 14 further comprises 60 m of dispersion-shifted fiber 36. It is contemplated that the length of gain fiber may be in the range of about 1 m to about 100 m, the output power of lasing material 34 may be in the range of about 1 mW to about 10 W, the length of the dispersion-compensating means 40 may be in the range of about 0 m to about 50 m and the length of the anomalous-dispersion fiber 36 may be in the range of about 1 m to about 10 km. It should be recognized a length 0 m for the dispersion-compensation means 40 would represent the lack of dispersion-compensation fiber serving as the dispersion-compensation means 40, but it is preferred that other means such as the grating means, previously mentioned, fill the void of dispersion-compensating fiber. Further, it should be recognized that these elements (34, 36 and 38) operatively interact with each other so that the numbers given for their respective parameters can vary widely.

In general, during the propagation of the optical pulses, generated by the lasing material 34 and traveling in the dispersion-shifted fiber 36, the optical pulses tend to evolve into an optical soliton thereby having their duration lowered to the desired value of about 1.3 ps. The soliton process is more fully described in the previously incorporated by reference technical article of D. J. Jones, H. A. Haus and E. P. Ippen.

The Faraday rotator/mirror 42 receiving the output of the dispersion-compensation means 40 is a 45° Faraday rotator integrated with a mirror, and may be of the type that is more fully described in the technical article of I. N. Duling, III and R. D. Esman, "Single-Polarization Fiber Amplifier," Electron. Lett., 1992, 28, pp. 126–127 and which is herein incorporated by reference. Further, the Faraday rotator/mirror 42 may be of the type described in the '427 patent.

The Faraday rotator/mirror 42 combination reflects light in a polarization state orthogonal to its incident state which is established by the polarizing beamsplitter 20. In operation, at every point in the birefringent fiber such as in either fiber 36 or fiber 40, the orthogonal relation between the incident and returning light is preserved. More particularly, if the light produced by the lasing material 34 encounters any birefringence interaction on the way in the laser cavity, comprising elements 36 and 40, such interacted light is compensated for on the way out of the laser cavity. In the overall operation of birefringence-compensating branch 14, if the incident light is linearly polarized, the returning light is also linearly polarized and rotated by 90°.

The Faraday rotator/mirror 42 by its inherent operation creates a counterpropagating light beam that is orthogonal to the linearly polarized light provided by the beamsplitter 20. The light within the birefringence compensating branch 14 is being transmitted in both directions at the same time in a manner similar to that described in the '739 patent. The polarizing beamsplitter 20 ejects any counterpropagating light which is not rotated by precisely 90° and, thus, passes the rotated by 90° counterpropagating light created by the Faraday rotator/mirror 42 onto the single-polarization isolator 22 which, in turn, passes it onto the optical coupler 24 which, in turn, passes 80% of it onto the phase shifter 30. The phase shifter 30 phase shifts (or rotates the polarization state of) the counterpropagating light created by the Faraday rotator/mirror 42 by 90° so as to return, via the input stage 64 of the modulator 18, the counterpropagating light at the original linearly polarized orientation associated with the modulator 18. Because the modulator 18 receives linearly polarized light and the Faraday mirror 42 provides counterpropagating light rotated by 90°, the modulator 18, in cooperation with the non-polarization maintaining (PM) lasing material 34, provides linearly polarized light that is emitted from the optical fiber laser source 10 of FIG. 1 as output signal 84.

The Faraday rotator/mirror 42 receives its input light by way of the dispersion-compensating means 40 which partially compensates the overall dispersion of the laser produced by the lasing material 34 in a manner known in the art, and along the lines described in the '427 patent. In one embodiment utilizing a frequency synthesizer 44 generating a 10-GHz signal, the dispersion-compensation means 40, having the characteristic previously given, was selected to have a length of 14.9 m, whereas the anomalous-dispersion fiber 36 was selected to have a length of 60 m. In this same embodiment, the 10 GHz synthesizer 44 operated in the "actively mode-locked" condition and created a repetition rate corresponding to about 9960 pulses circulating in a cavity formed by the dispersion-compensation means 40 and the anomalous-dispersion fiber 36 wound on the PZT cylinder 38. The manner in which the predetermination of the number of pulses circulating in the laser cavity is known in the art and is dependent upon various parameters, such as round trip time of light through the cavity, and the period of timing signals applied to the modulator 18, all of which are more fully described in the '739 patent.

In order that laser source 10 generates linearly polarized light in synchronization with frequency source 44, and thus in synchronization with other users of the optical communication system in which laser source 10 is utilized, the length of the laser cavity (cumulative and operative length of the anomalous-dispersion fiber 36 and dispersion-compensation means 40) is preferably adjusted and maintained at an optimum length with respect to the frequency of the frequency source 40. The adjustment of the length of the cavity is known in the art and is described in the '739 patent. Alternatively, length-stabilization of the cavity may be provided by the circuit arrangement disclosed in the technical article "Stabilization of a Mode Locked ER-doped Fibre Laser by Suppressing the Relaxation Oscillation Frequency Component" of H. Takara, S. Kawanishi and M. Saruwatari, published in *ELECTRONICS LETTERS* Feb. 16th, 1995, Vol 31, No. 4, which is herein incorporated by reference.

The adjustment of the length of the cavity, in one embodiment, is provided by the expansion and contraction of the PZT cylinder 38. More particularly, the PZT cylinder 38, in one embodiment, preferably forms a part of a feedback loop stabilizing network of the present invention that allows the cavity length to be maintained with respect to the frequency of the frequency synthesizer 44. The feedback loop stabilizing network compensates for any shift in the timing of the output pulses produced by the laser source 10 in response to experiencing environmental fluctuations, such as caused by mechanical impact shocks. The compensation is provided by developing the error signal 92 to actively stabilize the length of the cavity. Specifically, the PZT cylinder 38 is expanded and contracted, in a manner known in the art, in response to the error signal 92 responsive, in part, to the frequency source 44 so that the length of the cavity is varied as a function of the frequency of the frequency source 44. The present invention can change the effective cavity length by about 0.9 cm and maintain the length of the cavity with 2 um of precision. The length of the PZT cylinder 38 varies in response to the phase difference detected between the train of laser pulses generated by the laser source 10 traveling in polarization-maintaining loop 12 and the reference signal generated by the frequency source 44. This phase detection is accomplished, in one embodiment of the present invention, by the phase sensitive detector 16.

The phase sensitive detector 16 develops the error signal 92 in response to difference in phase between the modulating signal, that is the signal developed from the 10 GHz synthesizer 44, and the extracted predetermined portion of the train of laser pulses generated by the optical fiber laser source 10 being launched out of the optical fiber 82 in the form of light rays 88 that intercept the photodetector 52, or some other optical-electronic coupler responsive to light rays. The photodetector 52 may be of the type described in the previously incorporated by reference '524 patent.

The 10 GHz modulating signal is received by the first amplifier 46 which provides an output signal representative thereof that is applied to a first input of the phase detector 56 which may be of the type described in the '524 patent. The photodetector 52 receives the extracted predetermined portion of the train of laser pulses generated by the optical fiber laser source 10 that are preferably routed to the tuning stub 62 which, in turn, directs the output signal of the photodetector 52 to the second amplifier 54 which, in turn, provides an output signal representative thereof that is routed to a second input of the phase detector 56.

The phase detector 56 receiving the output signals from the first and second amplifiers 46 and 54, respectively, provides an output signal on signal path 98 that is proportional to the difference between the phases of the output signals of the first and second amplifiers 46 and 54, respectively, and which is routed to an integrator 58. The integrator 58 provides an output 0Ii signal on signal path 100 that is proportional to the integral of the signal on signal path 98 with respect to elapsed time and such a signal is routed to a high voltage amplifier 60. The integrator 58 has a typical integrating time constant of 10 ms. A proportional amplifier (not shown), operating in parallel with the integrator 58, passes more rapid error signals on to the length-stabilizing element 38 could be added to improve length stabilization. The high voltage amplifier 60 provides an output voltage which serves as the error signal 92 which is applied to the piezoelectric (PZT) cylinder 38 which, in turn, changes its shape in response thereto. As the PZT cylinder 38 changes its shape, that is, expands and contracts, the length of the anomalous-dispersion fiber 36, or of other fiber constituents of the laser which are wound on the PZT cylinder, correspondingly expands and contracts so that the length of the cavity, defined by the cumulative and operative length of anomalous-dispersion fiber 36 and the dispersion-compensating means 40, in which the pulse train generated by the laser source 10 travels, correspondingly changes.

In operation, the output of the modulator 18 is routed to the polarized beamsplitter 20 which operates in a single-polarization mode to produce a linearly polarized output carrier signal that is directed to the lasing material 34. The lasing material 34 is preferably a non-polarization-maintaining (PM) gain fiber. In one embodiment, a birefringence-compensating agent, formed by the anomalous-dispersion fiber 36 wound on the PZT cylinder 38 and the dispersion-compensation means 40 which is in cooperation with Faraday rotator/mirror 42, provides a counterpropagating light beam that is routed back to the modulator 18 after receiving a 90° phase shift. As previously mentioned, the phase sensitive detector 16 detects any phase difference between the modulating signal applied to the modulator 18 and the phase of the signal present in the light rays 88 representative of the train of laser pulses produced by optical fiber laser source 10. The phase sensitive detector 16 develops the error signal 92 that is applied to the PZT cylinder 38 which, in turn, changes its shape until the phase difference between the modulating signal and the train of laser pulses is essentially zero.

In practice, the modulator 18 or the components making up the laser source 10 of FIG. 1 may encounter an event, such as vibration, that creates a timing error or a disparity between the train of laser pulses generated by the laser source 10 and the frequency signal generated by the frequency synthesizer 44 and such disparity causes the generation of the error signal 92 which, in turn, causes the birefringence-compensating agent, also referred to herein as the compensator, to adjust the length of the cavity until the disparity is nulled out.

The compensator, that is, the components controlling the length of the cavity may be accomplished by various arrangements, such as that shown in FIG. 1, or may be accomplished by temperature-controlling the fiber length, that is, the length of the fibers 36 and 40.

The output of the optical fiber laser source 10 may be obtained from the coupler 26, the dual output 66A of the modulator 18, or at the output of the Faraday rotator/mirror 42 shown in FIG. 1 as 42B; however, output 42B will be in general not linearly polarized. Optical outputs may be obtained from other locations within the laser by inserting output couplers between nearly any two existing laser components. The Faraday rotator/mirror 42 may be replaced with loop mirrors as shown in FIG. 2.

FIG. 2 is composed of FIGS. 2(A), 2(B) and 2(C) that employ loop mirrors 102, 104 and 106 respectively. As seen in FIG. 2(A), loop mirror 102 is coupled to the Faraday rotator 115 by a coupler 108 having a coupling ratio of 0.5, and, conversely, as seen in FIG. 2(B) loop mirror 104 is coupled to the Faraday rotator 115 by a coupler 110 having a coupling ratio that is not 0.5. FIG. 2(C) shows the loop mirror 106 coupled to the fiber 40 by a coupler 112 having a coupling ratio of 0.5, with the loop mirror 106 operatively connected to a Faraday rotator 114 that is rotated 90°, unlike the 45° of the Faraday rotator 134 of FIGS. 2(A) and 2(B).

All of the embodiments of FIG. 2 use a reflecting loop mirror rather than a bulk mirror as used in Faraday rotator/mirror 42. A loop mirror returns all incident light along the original input path if its coupler, such as 108, 110 or 112, has a 0.5/0.5 coupling ratio. In FIG. 2(A), the loop mirror 102 and a 45° Faraday rotator 134 are directly substituted for the Faraday rotator/mirror 42 previously described. In FIG. 2(B), the coupler 110 allows the output of the optical fiber laser source 10 to be taken from the rejected output of the loop mirror 104 and such an output is shown as signal 104A. Again, this output signal 104A has the disadvantage of the output light not being linearly polarized in a manner as described for output signal 42B of FIG. 1. In FIG. 2(C), the loop mirror 106 cooperates with an internal 90° Faraday rotator 114 and has the same polarization-orthogonalizing action as the original 45° Faraday rotator-plus-mirror design described with reference to FIG. 1. The output of the optical fiber source 10 may or may not be taken from the rejected port of the loop mirror 106 of FIG. 2(C) in a manner as described with reference to FIG. 2(B).

In addition to the alternate embodiments of FIG. 2, the present invention has further alternate embodiments related to the modulator and such may be further described with reference to FIGS. 3, 4, 5 and 6.

FIG. 3 illustrates a circuit arrangement 116 that includes a so called Sagnac interferometer amplitude modulator comprising a phase modulator 118 cooperating with a non-reciprocal bias unit 120 which, in turn, provides an output to polarization-maintaining (PM) coupler 122. The PM coupler 122 also receives the output of the phase shifter 30 and supplies a modulated signal to the first section 72 of the polarized stage of the beamsplitter 20. The Sagnac interferometer amplitude modulator replaces the modulator 18 of FIG. 1 and, except for this replacement, the circuit arrangement of FIG. 3 operates in the same manner as that of FIG. 1. The Sagnac interferometer amplitude modulator is particularly suited to eliminate the temperature dependence of the operating bias voltage of Mach-Zehnder interferometers. All the components of the PM loop 12 of FIG. 3 are of the polarization-maintaining type and the isolator 22, output coupler 24, phase shifter 30 may be placed anywhere on the right side, as viewed in FIG. 3, of the PM coupler 122 and, further the modulator 118 and bias unit 120 may be interchanged. The Sagnac interferometer amplitude modulator (SIAM) is more fully disclosed in the technical article of M. L. Dennis, I. N. Duling III and W. K. Burns, "Inherently Bias-Drift Free Amplitude Modulator," Electron. Lett. 32, 547 (1996), which is herein incorporated by reference.

Figure 4:
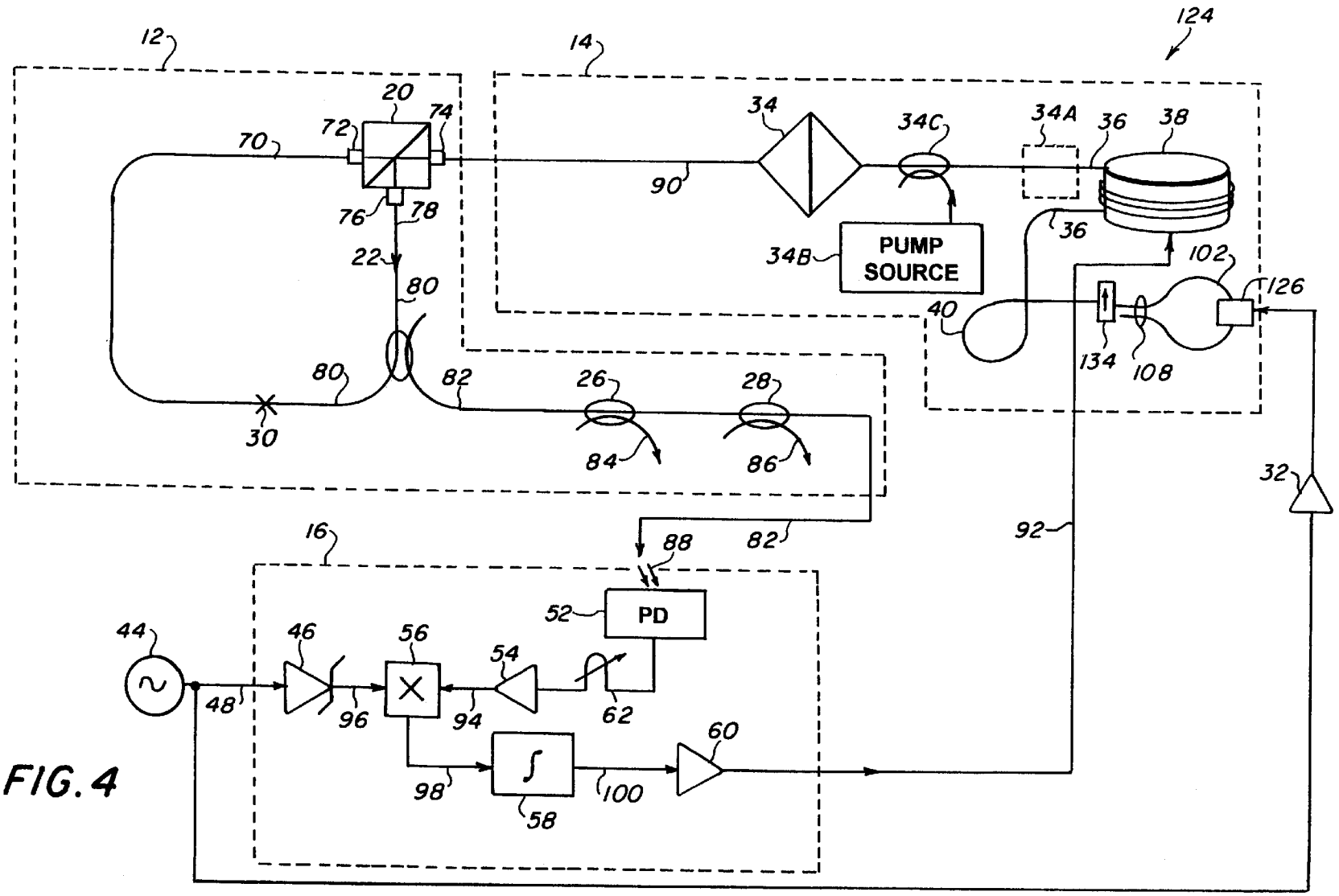

FIG. 4 illustrates a circuit arrangement 124 including an electro-optic (EO) or acousto-optic (AO) modulator 126, known in the art, which is operatively interconnected to the loop mirror 102 described with reference to FIG. 2(A). The electro-optic or acousto-optic modulator 126 preferably receives its modulation signal via amplifier 32 described with reference to FIG. 1. As is known in the art, since the electro-optic modulator 126 is not inherently a single-polarization device, it needs to be operatively placed inside the loop mirror 102 and, if desired, the loop mirror 102 may be replaced by either the loop mirror 104 or 106, with the electro-optic or acousto-optic modulator 126 remaining operatively connected to the selected loop mirror 104 or 106.

Figure 5:
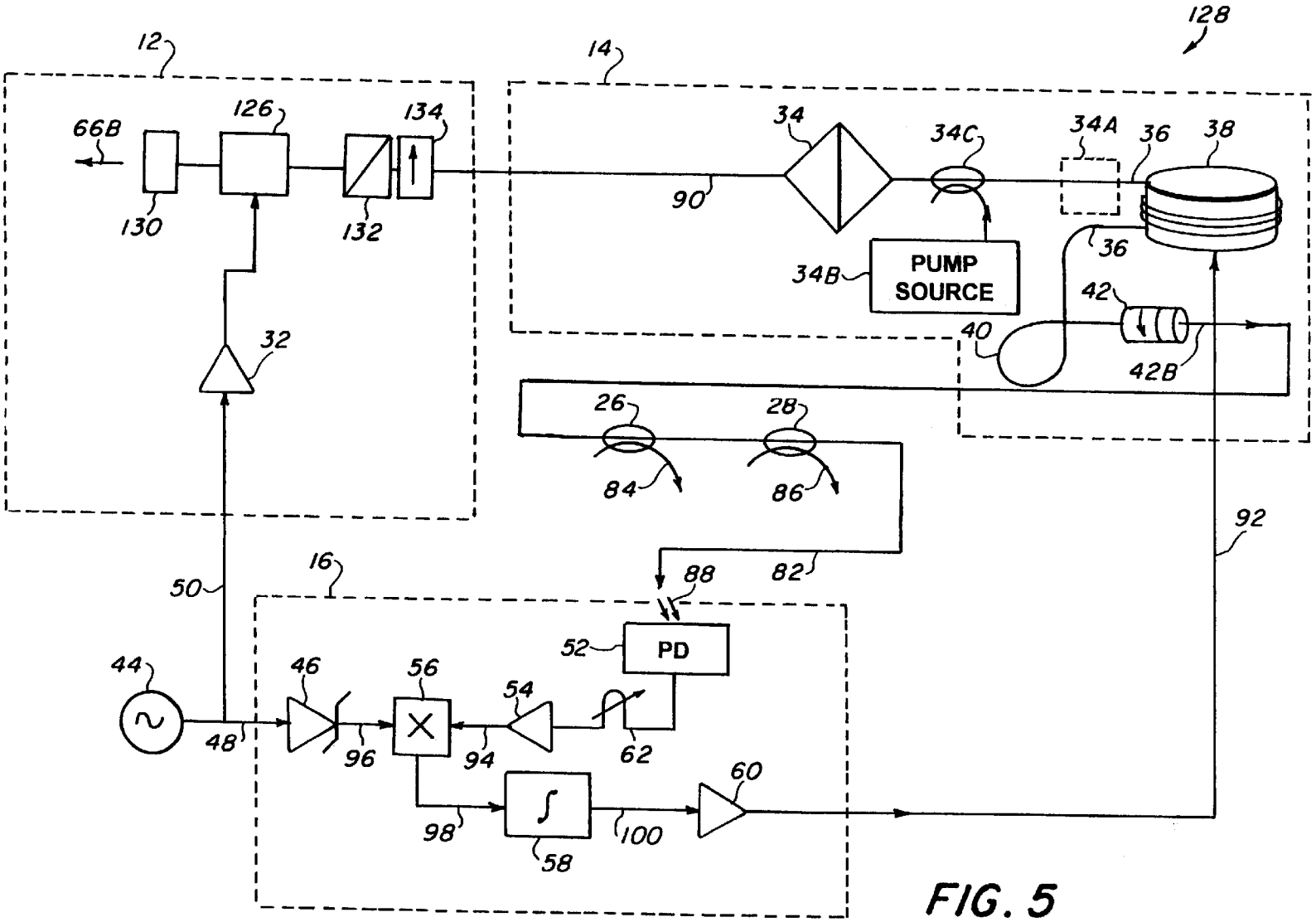

FIG. 5 illustrates an arrangement 128 including a linear array of components including the modulator 126, a mirror 130, a polarizer 132 and a Faraday rotator 134. A comparison between the arrangement 128 of FIG. 5 and the arrangement 10 of FIG. 1 reveals that the beamsplitter 20, isolator 22 and coupler 24 of FIG. 1 are not present in FIG. 5, but rather the serially arranged polarizer 132 and Faraday rotator 134 accept the output signal of the modulator 126 and direct it onto the lasing material 34. Further, as seen in FIG. 5, the modulator 126 is operatively coupled to the mirror 130 which provides the output signal 66B already described with reference to FIG. 1. Furthermore, the arrangement 128 of FIG. 5 directs the output 42B of the Faraday rotator/mirror 42 to the coupler 26 which provides the output signal 84 already described with reference to FIG. 1. The linear array of components 130, 132 and 134 may be either fiber-integrated or bulk elements. The modulator 126 may also be located within the Faraday rotator/mirror 42 in a manner as described for the electro-optic modulator 126 of FIG. 4. All of the loop mirror variations of FIG. 2 may be used in the arrangement 128 of FIG. 5.

Figure 6:
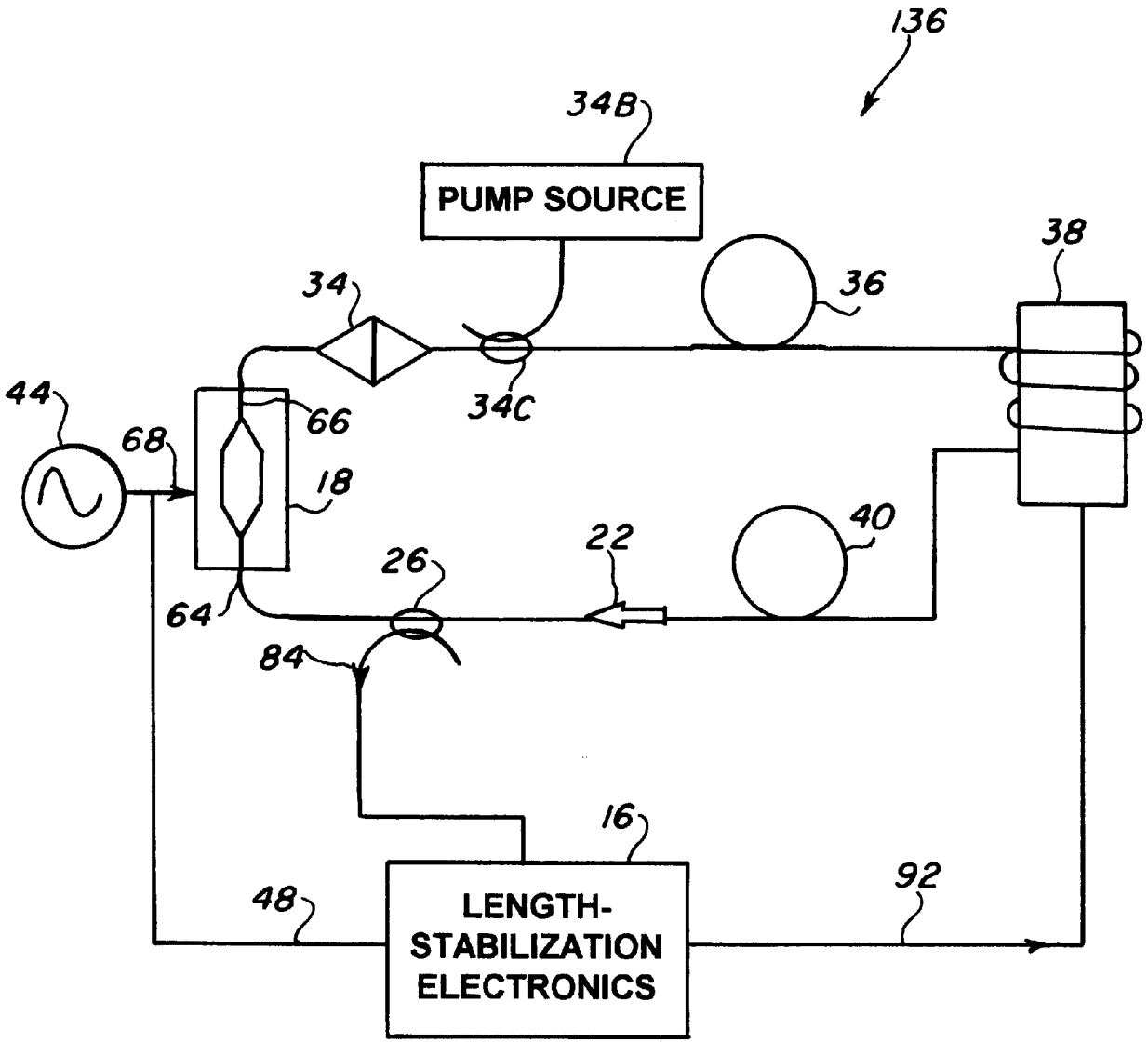

FIG. 6 illustrates an arrangement 136 constructed entirely out of polarization-maintaining (PM) fibers including the gain fiber 34, the anomalous-dispersion fiber 36, and the dispersion-compensation means 40. The arrangement 136 has no need for the beamsplitter 20, the phase shifter 30 and the Faraday rotator/mirror 42 all of FIG. 1. The arrangement 136 generally illustrates the length-stabilization electronics 16 of FIG. 1 which may also be the length-stabilization electronic disclosed in the previously mentioned technical article of Takara et al. The previously given characteristics for fibers 36 and 40 are preserved for arrangement 136 so that the duration of each of the pulses of the pulse train generated by the optical fiber laser source 136 is 1.3 ps or less.

Figure 8:
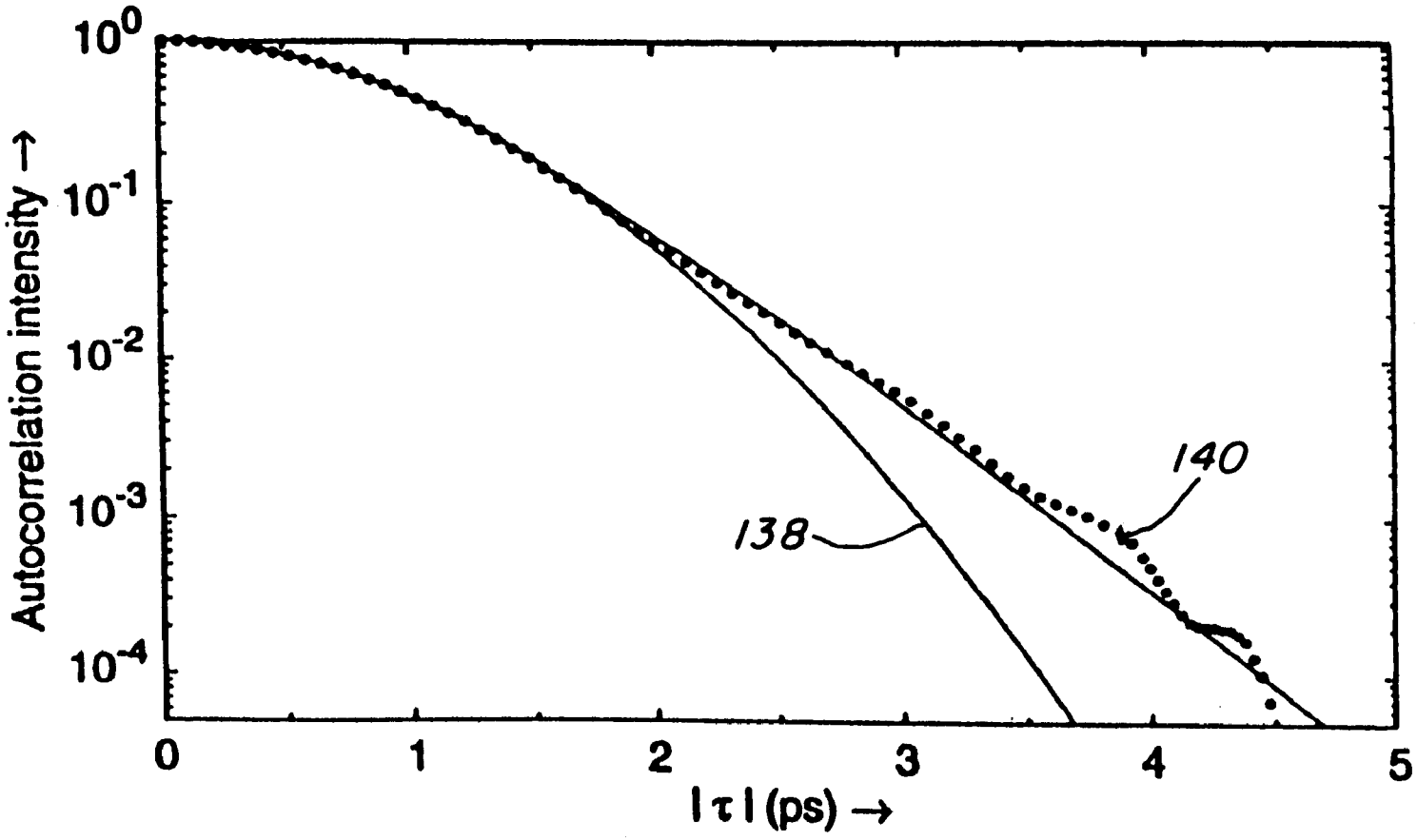
FIG. 8 is a semilogarithmic plot of the data of FIG. 7(A).
Figure 9:
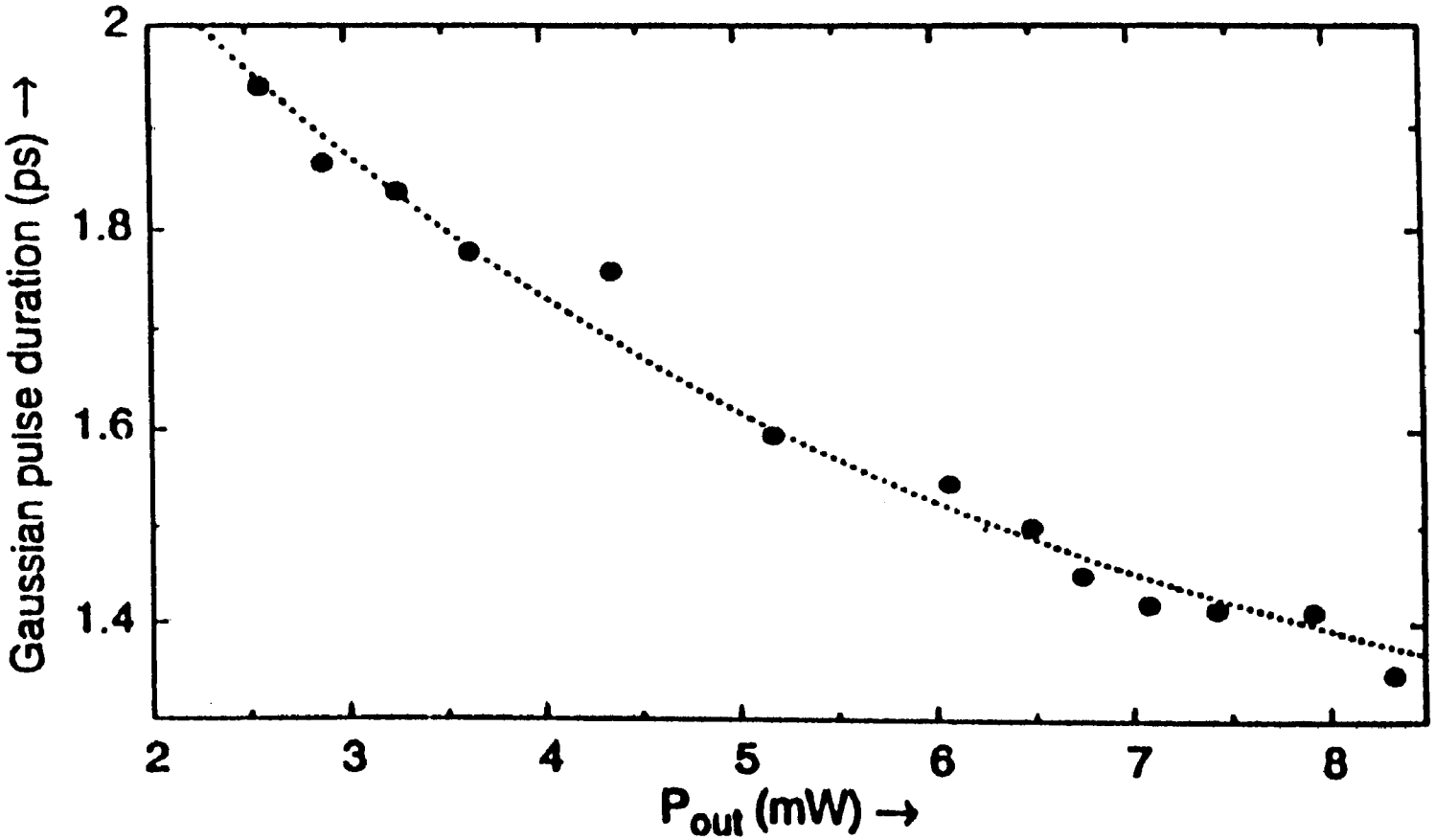
FIG. 9 illustrates a plot of the output pulse durations as a function of the average power of the output pulses.

In the practice of the invention, the optical fiber laser source 10 of FIG. 1 was tested and the results of which may be described with reference to FIGS. 7–9. The results of the testing are exhibited in FIG. 7 composed of FIGS. 7(A) and 7(B) which respectively illustrate the time autocorrelation function and the optical spectrum of the pulses yielded by the optical fiber laser source 10. As seen in FIG. 7(A) with respect to plots 138 and 140 respectively representative of Gaussian fit and $sech^2$ fits, at higher autocorrelation intensities the data fit a Gaussian more closely than a $sech^2$ autocorrelation function. The tail of the autocorrelation function clearly possesses the exponential nature of a $sech^2$ pulse, as is shown in the semilogarithmic plot of the autocorrelation function in FIG. 8. FIG. 8, with reference to plots 136 and 138, illustrates that the pulses show no sign of a background or a pedestal. As seen in FIG. 7(A), the autocorrelation full width at half-maximum (fwhm) is 1.9 ps, yielding, as known in the art, a Gaussian pulse duration of 1.35 ps (or 1.25 ps assuming a $sech^2$ profile). The optical output power of 8.3 mW, shown in FIG. 9, corresponds to a pulse energy of 4.1 pJ inside the laser cavity, somewhat higher than expected for a 1.3-ps soliton.

Figure 7B:
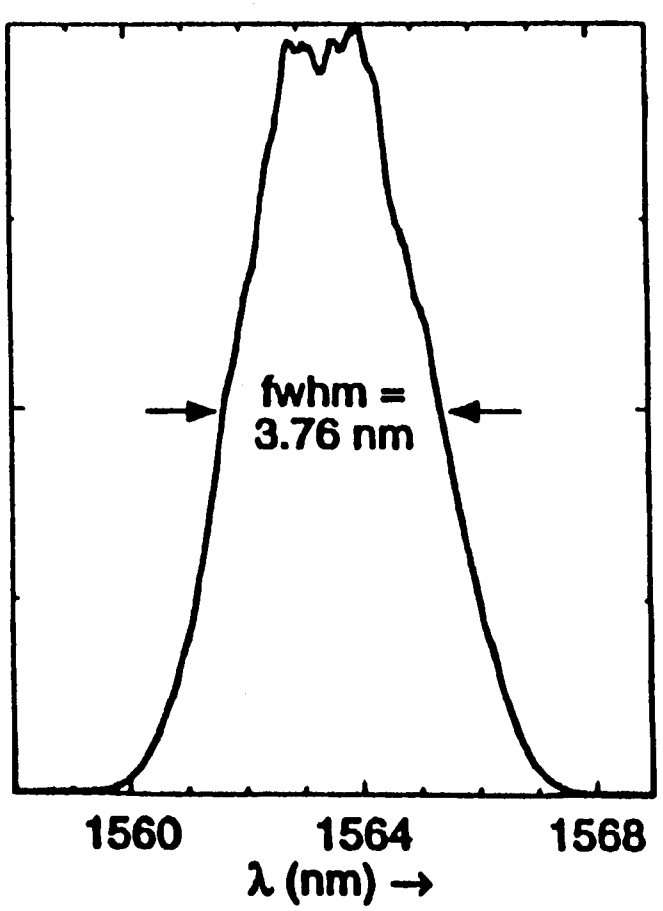
FIG. 7 is composed of FIGS. 7(A) and 7(B) that respectively illustrate a time autocorrelation and spectrum of the output pulses of the optical fiber laser source of the present invention.
Figure 7A:
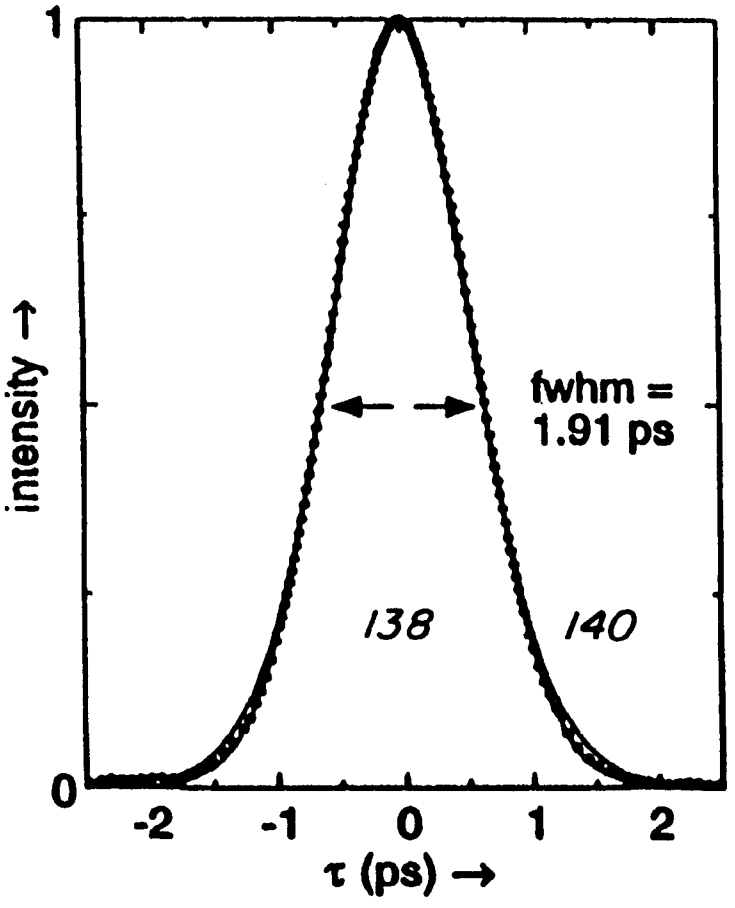

As seen in FIG. 7(B), the optical spectrum has a fwhm of 3.76 nm, yielding a time-bandwidth product of 0.62~40% above the transform limit of 0.44 for a Gaussian pulse. Since a pulse evolves during its circuit pass through the laser cavity comprising fibers 36 or 40, a different extraction point from the one used might yield better pulse parameters. However, soliton like pulses with Gaussian intensity profiles are commonly seen in periodic systems that contain fibers of differing dispersion in a manner more fully disclosed in the technical article of H. A. Haus, K. Tamura, L. E. Nelson, and E. P. Ippen, entitled "Stretched-Pulse Additive Mode-Locking in Fiber Ring Lasers: Theory and Experiment," published in IEEE J. Quantum Electron. 31, 591 (1995) which is herein incorporated by reference. These periodic systems can also contain stable high-energy pulses with high time-bandwidth products in a manner more fully disclosed in the technical article of N. J. Smith, F. M. Knox, N. J. Doran, K. J. Blow, and I. Bennion, entitled "Enhanced Power Solitons in Optical Fibers with Periodic Disperson Management," published in Electron. Lett. 32, 54 (1996) which is herein incorporated by reference.

Because the optical fiber laser source of any of the embodiments of the present invention contains no passive mode-locking mechanism, we do not expect to see dropouts in its output pulse stream. We measured the pulse dropout ratio to be less than $10^{-12}$ by driving the laser at 10 GHz and searching its output for missing pulses with a bit-error-rate tester. We calculated upper bounds of 0.16 ps and 1.1 to the rms time and the amplitude jitter, respectively, in the pulse train by measuring and integrating the rf phase noise out to 200 kHz from the modulation frequency in a manner more fully disclosed in the text of D. von der Linde, Appl. Phys. B39, 201 (1986), and also in a manner more fully disclosed in the technical article of U. Keller, K. D. Li, M. Rodwell, and D. M. Bloom, entitled "Noise Characterization of Femtosecond Fiber Raman Soliton Lasers," published in IEEE J. Quantum Electron. 25, 280 (1989). The appropriate section of the text and the technical article are herein incorporated by reference.

In the practice of this invention experiments have been conducted that manifest the conclusion that the birefringence compensating branch, such as branch 14 of FIG. 1, plays an important role in ensuring a filled pulse train. More particularly, nonlinearly propagating light in the non-PM branch generally undergoes an intensity-dependent polarization rotation; but the rotated component is rejected from the cavity by the polarizing beamsplitter 20. The consequent intensity-dependent loss encourages the production of a completely filled pulse train in a manner as disclosed in the technical article of M. Nakazawa, K. Tamura, and E. Yoshida, entitled "Supermode Noise Suppression in a Harmonically Modelocked Fiber Laser by Self Phase Modulations and Spectral Filtering," published in Electron. Lett. 32, 461 (1996) and herein incorporated by reference.

According to the soliton model of Kartner et al, disclosed in the previously incorporated by reference technical article published in J. Opt. Soc. Am B12, 486 (1995), the factor R by which pulse durations are reduced below the Kuizenga-Siegman active mode-locking limit is given by:

$$R \le R_{\max} \approx 1.37\sqrt[4]{\frac{\beta_2 l}{g/\Omega_{g2}}}$$

where $\beta_2=\lambda^2<D>/(2\pi c)$ is the group-velocity dispersion, l is the laser's effective cavity length, g is its steady-state gain, and $\Omega_g$ is its gain bandwidth. For our optical fiber laser sources of our embodiments, the maximum expected reduction is $R_{max}\approx 4.4$; our estimate of the experimental value of R is 3.7. The approximately linear dependence of pulse duration on average power presented in FIG. 9 suggests that we have not yet attained the maximum degree of soliton pulse shortening; relation (1) predicts a minimum pulse duration of ~1.15 ps for a sufficiently high average pulse power.

In the practice of our invention concerning a soliton optical fiber laser source, if one decreases the degree of self-phase modulation (SPM) by reducing the pump power and therefore the average pulse power, the pulses increase in duration. FIG. 9 demonstrates that the pulse duration can be varied between 1.35 and 1.9 ps by this means; even in these low-power conditions, the optical fiber laser source of the present invention produces a completely filled pulse train. We also reduced the pulse duration to 1.15 ps by increasing <D> to 2.6 ps/(nm km) by removing 1.4 m of the dispersion-compensating fiber; the cost of the shorter pulses is a higher soliton energy and therefore a lower maximum rate of the laser. We anticipate that the optical fiber source of the present invention could be mode-locked at frequencies well in excess of 10 GHz if <D> were lowered so that soliton like pulses with a lower pulse energy could be produced.

It should now be appreciated that the practice of the present invention developed an externally clocked, environmentally stable single-polarization fiber soliton laser that uses non-PM gain and dispersion-compensating fibers. Our invention is capable of producing 1.3-ps pulses at repetition rates in excess of 10 GHz with low amplitude and phase noise and with a measured pulse dropout ratio of less than one in $10^{12}$. Furthermore, the optical fiber laser source is particularly suitable for fiber-optic communication systems.

It also should be appreciated that the practice of the present invention provides for an actively mode-locked laser source that provides for a pulse train in the picoseconds or sub-picoseconds range, that is essentially noise-free because of the polarization-maintaining loop as well as the birefringence-compensating branch. The pulses of the train have low timing errors and low amplitude jitter.

It should be further appreciated that the practice of the present invention provides for a non-polarization-maintaining (PM) gain fiber used as the lasing material and yet provides for a linearly-polarized coherent output light.

It should, therefore, readily be understood that many modifications and variations of the present invention are possible within the purview of the claimed invention. It is, therefore, to be understood that, within the scope of the appended claims, the invention may be practiced other than as specifically described.

What we claim is:

1. An optical fiber laser source comprising:

a lasing material having a length in the range of about 0.5 m to about 100 m and input and output sections;

a source for activating the lasing material to produce light at said output stage of said lasing material;

a frequency signal generator for providing a modulating signal;

a modulator having input and output stages and a control terminal for receiving the modulating signal provided by said frequency signal generator, said modulator being responsive to said modulating signal for developing a carrier signal at its output stage that is varied and in sympathy with said modulating signal, said carrier signal being applied to said input section of said lasing material;

anomalous-dispersion fiber having a length in the range of about 10 m to about 10 km and an input and an output with said input of said anomalous-dispersion fiber coupled to said output stage of said lasing material;

dispersion-compensating means having a length in the range of about 1 m to about 100 m and an input and an output with said input of said dispersion-compensating means coupled to said output of said anomalous-dispersion fiber; and a first coupler having first fiber means for coupling to said output of said isolator and applying a predetermined ratio of a signal thereat, said first coupler also having second fiber means for applying said signal at said output of said isolator to said input stage of said modulator.

2. The optical fiber source according to claim 1, wherein said dispersion-compensation means is selected from the group consisting of dispersion-compensating fiber and grating means.

3. The optical fiber laser source according to claim 1, wherein said lasing material, said anomalous-dispersion fiber, said dispersion-compensating means, said first fiber means, and second fiber means are selected from the group consisting of polarization-maintaining fibers and non-polarization-maintaining fibers.

4. The optical fiber laser source according to claim 3, wherein said lasing material, said anomalous-dispersion fiber and said dispersion compensating means are non-polarization-maintaining fiber.

5. The optical fiber laser source according to claim 1 further including:

an isolator coupled to said output of said anomalous-dispersion fiber.

6. The optical fiber laser source according to claim 5 further comprising:

a beamsplitter having a first polarized section for receiving the carrier signal at the output stage of the modulator and a second polarized section and a trunk stage for distributing signals in predetermined proportions, said trunk stage having means for coupling to said input section of said lasing material;

one or more couplers including said first coupler coupled to said second section of said beamsplitter for extracting a predetermined portion of signal thereat and allowing the remaining portion of said extracted signal to be directed to said input stage of said modulator after being intercepted by a phase shifter so that said remaining portion is shifted in phase by about 90 degrees;

a phase sensitive detector having couplers for coupling to said modulating signal and to said extracted predetermined portion of said signal at said beamsplitter for developing an error signal whose value is proportional to the difference in phase between said modulating signal and said extracted predetermined portion of said signal at said beamsplitter; and a compensator connected to said output section of said lasing material and responsive to said error signal.

7. The laser source according to claim 1, wherein said modulator is selected from the group consisting of Mach-Zehnder, electro-optic, acousto-optic amplitude and phase modulator types.

8. The laser source according to claim 4, wherein said lasing material is a gain fiber having a dopant comprising an Erbium material.

9. The laser source according to claim 4, wherein said lasing material is a gain fiber having a co-dopant comprising Erbium and Ytterbium.

10. The laser source according to claim 4, wherein said lasing material is a gain fiber comprising other lasing materials.

11. The laser source according to claim 6 further comprising a laser diode interposed between the output section of said lasing material and said compensator responsive to an error signal.

12. The optical fiber laser source according to claim 6, wherein said beamsplitter is a single-polarization type.

13. The optical fiber laser source according to claim 5 further comprising:

an optical circulator having a first polarized section for receiving the carrier signal at the output stage of the modulator and a second polarized section and a trunk stage for distributing signals in predetermined proportions, said trunk stage having means for coupling to said input section of said lasing material;

one or more couplers including said first coupler coupled to said second section of said optical circulator for extracting a predetermined portion of signal thereat and allowing the remaining portion of said extracted signal to be directed to said input stage of said modulator after being intercepted by a phase shifter so that said remaining portion is shifted in phase by about 90 degrees;

a phase sensitive detector having couplers for coupling to said modulating signal and to said extracted predetermined portion of said signal at said beamsplitter for developing an error signal whose value is proportional to the difference in phase between said modulating signal and said extracted predetermined portion of said signal at said beamsplitter; and a compensator connected to said output section of said lasing material and responsive to said error signal.

14. The laser source according to claim 6, wherein said one or more couplers for extracting comprise said first optical coupler having a coupling ratio so that said extracted predetermined portion of said signal is a first percentage of said signal of said second section of said beamsplitter and said remaining portion of said extracted signal is a second selected percentage of said signal of said second section of said beamsplitter.

15. The laser source according to claim 14 wherein said one or more couplers are located anywhere within the laser source.

16. The laser source according to claim 14, wherein said isolator is connected to said second section of said beamsplitter and is a single polarization type.

17. The laser source according to claim 14 further comprising a second optical coupler receiving said first percentage of said signal from said first coupler predetermined portion of said signal from said first coupler and having a coupling ratio so that a preselected percentage of said first percentage extracted predetermined portion of said signal is allowed to pass therethrough, and the preselected percentage of said first percentage extracted predetermined portion of said signal is transferred and serves as a signal output therefrom.

18. The laser source according to claim 17 further comprising a third optical coupler receiving said extracted predetermined portion of said signal passed by said second coupler and having a coupling ratio so that said extracted portion of said signal from said second optical coupler is allowed to pass therethrough and a portion of said extracted portion of said signal from said second optical coupler is transferred and serves as a diagnostic signal therefrom.

* * * * *